United States Patent [19]

Hughes

[11] 4,058,774
[45] Nov. 15, 1977

[54] OPTICAL TRANSPONDER

[76] Inventor: John Leonard Hughes, 34 Nungara Place, Aranda, Canberra A.C.T., Australia, 2614

[21] Appl. No.: 734,112

[22] Filed: Oct. 20, 1976

[30] Foreign Application Priority Data

Oct. 21, 1975 Australia .............................. 3665/75

[51] Int. Cl.² .......................... H01S 3/02; H01S 3/10; G01P 3/36
[52] U.S. Cl. ........................................ 330/4.3; 356/5; 356/28
[58] Field of Search ........................ 330/4.3; 332/7.51; 356/5, 28; 331/94.5 P, 94.5 C

[56] References Cited

U.S. PATENT DOCUMENTS

| 3,573,463 | 4/1971 | Goodwin et al. | 250/199 |
| 3,887,876 | 6/1975 | Zeidar | 330/4.3 |
| 3,958,881 | 5/1976 | Keene et al. | 356/28 |

OTHER PUBLICATIONS

Luford et al., "Very Long Lasers", Feb. 1974, pp. 379-390, Applied Optics, vol. 13, #2.

Primary Examiner—Nelson Moskowitz

[57] ABSTRACT

A remote site optical transponder device which automatically amplifies an incident laser pulse and returns it to its source is described. The device is especially useful in high precision ranging e.g. determining the motion of planets accurately and in tracking space craft. The device is powered by a long life power source and has a steerable laser light collector / transmitter system. Other essential components are a laser amplifier medium whose excitation means is triggered by part of the energy contained in an incident pulse from a laser tracking system and also a reflector.

10 Claims, 3 Drawing Figures fig 1

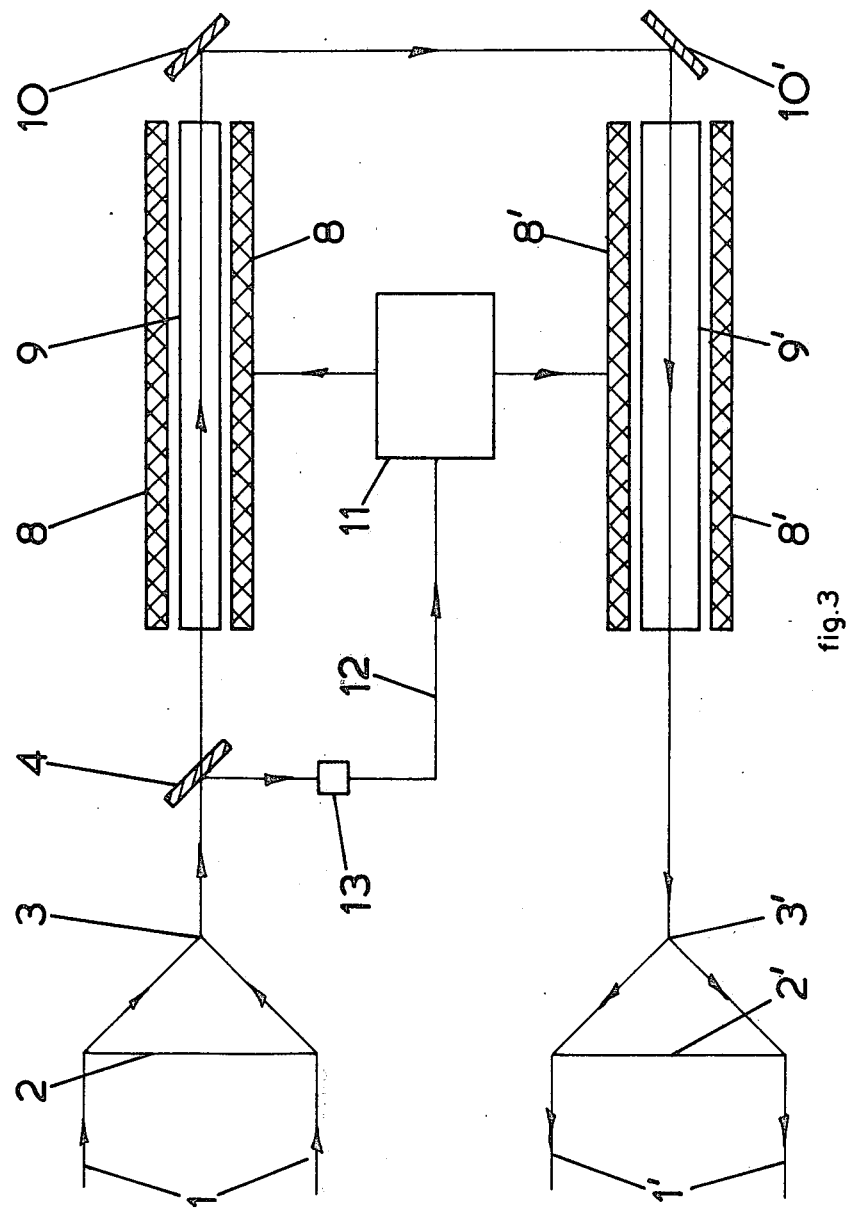

OPTICAL TRANSPONDER

FIELD OF THE INVENTION

This invention relates to a device which automatically amplifies an incident laser pulse and returns it to its source. In particular the invention concerns a remote site laser transponder device. The device is particularly useful for determining the motion of planets accurately and in tracking space craft.

DESCRIPTION OF THE PRIOR ART

Prior art techniques used in laser ranging to distant targets involved the use of a passive corner cube reflector which returned the incident laser pulse to its source without amplification. Such a device has been in use on the moon since 1969 and is well known in the art as the means of realising high precision lunar laser ranging capable of resolving the Earth-moon separation to 1 part in $10^{10}$ or better.

Although it appeared initially that such a passive reflector was the ideal choice, this has not proven so as technology advanced. The Apollo retro reflectors on the moon's surface enhance the return signal between 40 and 100 times (depending on the number of corner cubes in each package) compared with the reflection off the moon's surface. Furthermore, since the reflection is from a relatively small area about 1 m$^2$ compared with that of the curved, illuminated lunar surface, the timing of the pulse flight time from Earth to the reflector and back can be made with very high precision, about 1 in $10^{10}$ at present.

Unfortunately, due to the fact that the ratio of the illuminated area on the lunar surface to that of the retro reflector is very large about $10^6$, only a few photons arrive back at the laser tracking site compared with $10^{18}$ photons sent to the moon via the incident pulse from the laser system, i.e. photon efficiency of the present technique is about $10^{-20}\%$. To overcome such low overall efficiency very complex laser tracking facilities are required to try and utilize fully the lunar retro reflectors, themselves costing about $US2 million. In fact the cost of the laser tracking facilities on Earth required for this purpose range from $US2 million to $US5 million per site although in Australia one of six such facilities in the proposed world wide lunar ranging network has been set up at a fraction of the true cost by using some U.S. equipment which became available several years ago.

When a laser pulse of about $10^{18}$ photons is fired towards the moon in a well collimated beam it illuminates an area of about 10 km$^2$ on the lunar surface. This means that the lunar surface is irradiated with a photon flux of $10^{11}$ photons m$^{-2}$. Assuming that the retro reflector area was 1 m$^2$, then $10^{11}$ photons would be returned towards the source on Earth, but in a wider beam. The illuminated area around the laser tracker back on Earth would be about 100 km$^2$, so that the return photon flux on Earth would be about $10^3$ photons m$^{-2}$. About 10% would enter the detector photomultiplier tube, i.e. about 100 photons which in turn would produce about 10 photo electrons per shot. This ideal situation is not realised in practice where only one photo electron per several returns is achieved, implying that lunar laser ranging systems are operating very close to the impossible. If the separation between the laser tracking system and the retro reflector is extended then the aforementioned technique cannot be used due to lack of return signal — so that the tracking of planets is out of the question.

SUMMARY OF THE INVENTION

However, suppose that the $10^{11}$ photons m$^{-2}$ laser pulse irradiating the lunar surface could be amplified in some device before returning to Earth. If this pulse could be amplified by $10^6$ times, then as many photons would be sent back to Earth as were transmitted to the moon. If the same collimation of the beam could then be maintained the return pulse would irradiate the Earth with a photon flux density of $10^{11}$ photons m$^{-2}$, a flux which would completely saturate the existing detector systems.

It is an object of this invention to provide such a device herein referred to as an optical transponder which would achieve the necessary photon flux density. Broadly, this invention provides a remote site laser transponder system having a laser amplifier medium surrounded by an appropriate exciter which is powered in such a manner that it can be triggered by a laser pulse incident to the system.

A further object is to provide a device capable of determining planetary motion accurately.

BRIEF DESCRIPTION OF THE DRAWINGS

FIG. 3 shows two such devices in series.

The configurations shown are intended to be illustratory and not restrictive of the scope of the invention which is intended to have a broad connotation.

DETAILED DESCRIPTION OF THE DRAWINGS

The structure and operation of the device will be better understood when consideration is given to the description which follows.

Figure 1:
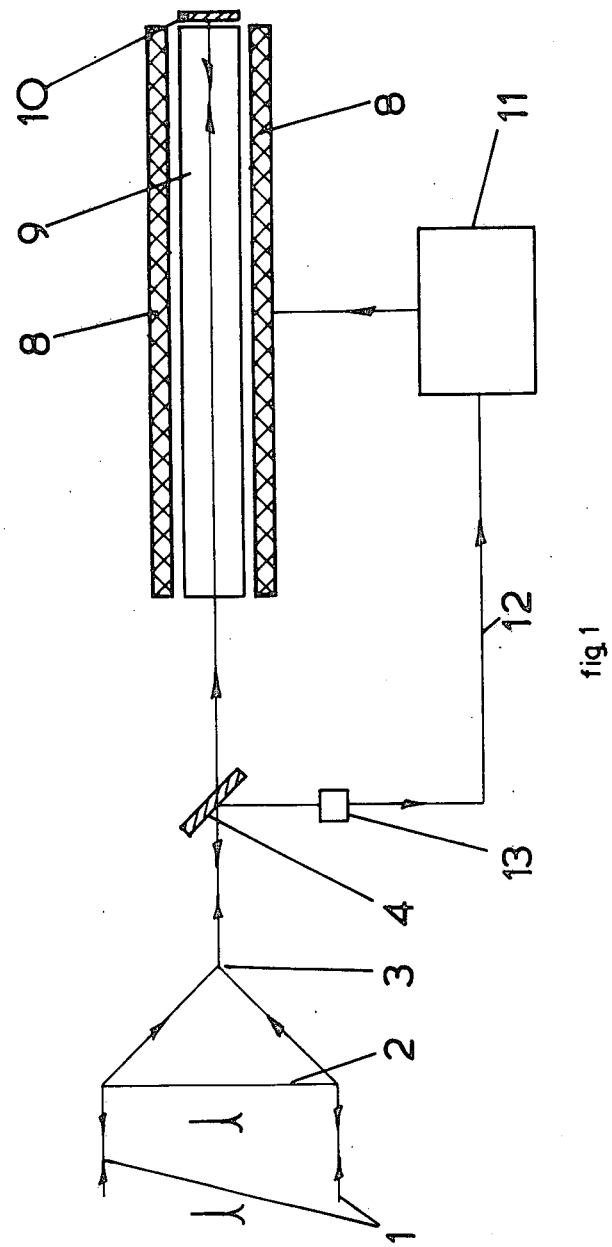
In FIG. 1 a relatively low enhancement laser transponder is shown.

Having regard to the device shown in FIG. 1, where an optical transponder using well known components is schematically shown and considering it in terms of either lunar or planetary ranging, 1 indicates the direction of the input and return laser pulse from an appropriate laser tracking system on Earth. 2 is a steerable light collector and transmitter 2 e.g. a tracking mirror of say $10^3$ cm$^2$ area. The pulse is then collimated by means of a beam collimator 3 to produce a beam of say 1 cm$^2$ in cross-section. This signal then traverses a beam splitter 4 which allows about 1% of the signal to be deflected to activate an optical detector 13 which converts the optical signal into an electrical pulse 12 which in turn activates a power supply 11 for the excitation means 8 surrounding the laser medium 9. The excitation means may be an optical exciter in the form of conventional flashtubes or photo emitting diodes or a combination of both or a particle exciter in the form of an electron beam. The exciter activates the laser medium which may be solid or fluid and brings it up to an amplification state but not such that the laser medium will self-oscillate. The laser signal used to activate the laser supply for the exciter is not amplified due to the fact that it passes out of the system before the amplification stage can be attained in the laser medium. However, a second laser pulse from the laser tracking station on Earth can be made to pass through the laser medium at the correct moment simply by transmitting it at the appropriate time after the initial pulse.

10 is a 100% fixed or moveable reflector i.e. it can be adjusted.

Figure 2:
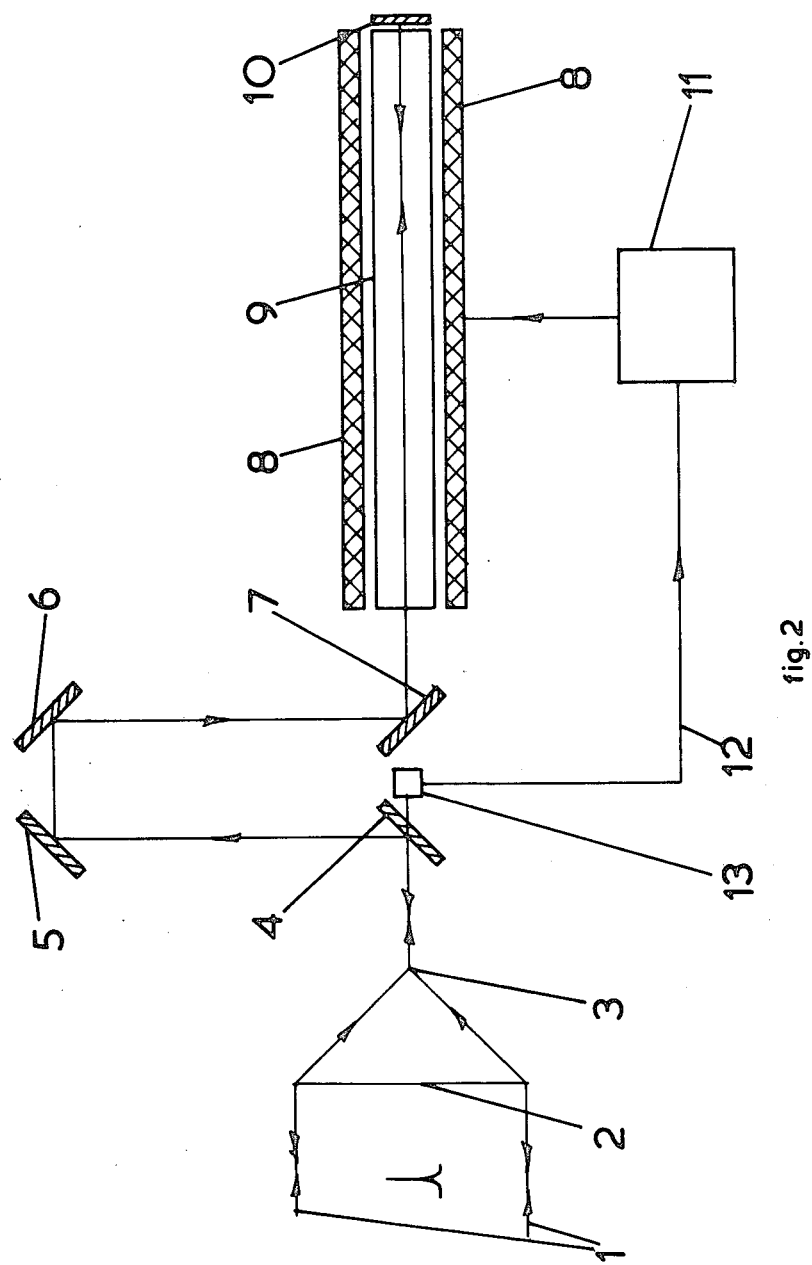
FIG. 2 illustrates a much higher gain configuration.

Referring now to FIG. 2, the numerals represent the same functional components. FIG. 2 shows a much higher gain configuration than is shown in FIG. 1 and includes three 100% reflectors 5, 6 and 7 (constituting an optical delay) arranged at 45° to the pulse as shown. In this high gain system the laser medium is excited so rapidly that the system is allowed to go into self-oscillation but not before the pulse has been amplified—this requires a delay for the pulse.

The operation of such a transponder placed on Mars would be as follows:

A laser pulse transmitted from an Earth tracking station at energies up to the 20 joule level, i.e. $\sim 10^{20}$ photon level, and one nano second pulse duration, i.e. a peak power of 20 gigawatts, in a total beamwidth of $10^{-4}$ radians, would illuminate the tracking mirror of the optical transponder with a photon flux density of $\sim 185$ cm$^{-2}$. Assuming a collector area of $10^4$cm$^2$, a total signal of $1.8 \times 10^6$ photons would be received on Mars. For the sake of simplicity it is assumed that either a Neodymium doped yttrium aluminium garnet laser medium, i.e. Nd : Yag, emitting at $\sim 10,600$ A or an Nd : phosphate laser glass emitting at about the same wavelength are being used. Therefore, the $1.8 \times 10^6$ photon signal picked up by the transponder collector would have a peak power of about $3.3 \times 10^{-4}$ watts. If pointed directly at the sun from the surface of Mars the transponder collector would pick up $3.2 \times 10^{-4}$ watts A$^{0-1}$. Assuming that the Nd : Yag signal can match a 1 A filter in the transponder, then the latter would pick up as much sunlight as laser signal whenever the sun was allowed to come into its field of view. In other words, the transponder would self-trigger repeatedly, probably to destruction. With an off-set of only $\sim 1°$ from the sun the intensity of sunlight entering a well designed optical detector system would be reduced by at least $3 \times 10^8$. Therefore, under normal operating conditions the problem of sunlight interference should not arise. The optical detector system could be automatically shut down if sun light interference became significant when tracking in line with the sun.

The $1.8 \times 10^6$ photons picked up by the collector of the signal would be passed from the tracking dish to be reflected into an optical delay line from a 99% reflecting mirror the collimation process increasing the beam divergence in its far field. Approximately 1% of the signal would then be extracted to trigger either a fast response photo-diode or a fast response photomultiplier, generating an electrical signal which in turn would be used to discharge a power supply of about 60 joules storage capacity, continuously charged from a 500 watt plutonium energy source, similar to those used on current Viking missions. The released energy would excite an array of photo-emitting diodes surrounding a Nd : Yag laser rod, the output radiation of the photo-emitting diodes being matched to the absorption bands of the Nd : Yag rod. In the simplest configuration the photo-emitting diode array would have to discharge about 60 joules of excitation energy in a period of about $10^{-8}$ seconds at a peak power of 6 gigawatts. This compares with an output of several megawatts from presently available Xenon flashtubes which are highly inefficient besides. The optical power loading of the photo-emitting diode array could be reduced considerably if the array could be split up into a slow and fast pulse section. The slow pulse, lower power section could be used to bring the laser rod nearly up to self-oscillation threshold, then the second section of the array could be pulsed very rapidly to take the laser rod into a very high gain condition, well above the self-oscillation threshold for long pulse excitation. It may also be possible to use conventional flashtubes for low power excitation to just below self-oscillation threshold.

The $1.8 \times 10^6$ photon signal pulse stored in the optical delay line would emerge from the optical delay line at $\sim 10^6$ photons and enter the Nd : Yag laser rod as the rod is brought up to high gain condition but before it attains the threshold for parasitic self-oscillation under these conditions of excitation. The signal would then undergo small signal amplification in the Nd : Yag rod, as given by $$I = I_o e^{\alpha x} \tag{5}$$

Taking gain $\alpha$ as 0.46 cm$^{-1}$ and $x = 30$ cms, we obtain $I = 10^6 \times e^{13.8} \sim 10^{12}$ photons in the signal as it reaches the end of the rod. The signal is then reflected from a reflector tilted slightly with respect to the direction of incidence of the pulse and is returned through the rod to gain another factor of $10^6$. Alternatively, the signal need not be returned through the same transponder but could be directed into a second, identical transponder, whose transmitting mirror was orientated at a slightly different angle to the collector mirror to compensate for aberration effects. The required $10^{12}$ gain compares with the $10^3$ double pass small-signal gain we can achieve in conventional Xenon flash tube pumped Nd:Yag rods of 7.5 cms length before self-oscillation effects set in. To achieve the $10^{12}$ double pass small-signal gain with existing flashtube pumped systems we would require four 7.5 cm long Nd:Yag rods, separated by six Pockel cells (or passive dye cells) to suppress the onset of parasitic self-oscillations. This proven technique would require a two pulse transmitter on Earth. If the cross-section of the transponder laser rod was 1 cm$^2$ and the pulse duration $10^{-9}$ seconds, then a signal of $10^{18}$ photons would keep the flux density below $10^9$ watts cm$^{-2}$, i.e. below damage threshold. The amplified pulse in any double pass device would then pass back through the tracking mirror system returning to the Earth-based station at a slight angle to its path of incidence, thus compensating for aberration effects arising from the relative movements of Earth and Mars. Assuming that energy is stored in the laser rod at $\sim 0.2$ joules cm$^{-3}$ a 30 cm$^3$ rod would require total stored energy of 6 joules. Therefore at 10% overall efficiency from a photo-emitting diode array we would require an input of $\sim 60$ joules.

Since the diameter of the returning beam would exceed the diameter of the Earth, the signal strength would be $\sim 3$ photons cm$^{-2}$. Assuming a collector area of $10^6$ cm$^2$, we would have a total signal of $3 \times 10^6$ photons. With a detector quantum efficiency of $10^{-3}$ at 10,600 A, the number of photons detected could exceed $10^3$ per pulse, thereby satisfying the strong signal requirement for Mars ranging. This implies that the proposed transponder could be operated over very long distances. Operation over distances of $\sim 300,000,000$ km should be possible, allowing Mars to be tracked throughout most of the year. As well, higher gains could be used in the transponder rod, provided that damage thresholds and parasitic self-oscillation thresholds were not exceeded during pulse amplification.

In FIG. 3, the numerals represent the same functional components as in FIG. 1 and shows two transponder devices in series. The reflector 10 is positioned at 45° as shown so that the pulse can be returned via the similar system, i.e. reflector 10', amplifying medium 9' activated by exciters 8', collimator 3' and steerable light transmitter 2'. 1' shows the direction of the return pulse.

An appropriate amplifying medium is a neodymium yttrium aluminium garnet rod. However, fluid mediums may be used. If desired for increased energy, elongated slab amplifiers utilizing elliptical cross-section laser beams may be used, e.g. gaseous iodine.

Besides its usefulness in monitoring Earth-Mars separation, the transponder of the present invention could be used for surveying and mining purposes.

Thus in summary this invention provides a remote site optical transponder device powered by a long life power source, having a steerable laser light collector/transmitter system, means for directing collected laser light into a laser amplifier medium whose excitation means is triggered by part of the energy contained in an incident pulse from a laser tracking system, a reflector located behind the laser medium which redirects the amplified incident pulse back through the laser medium and then through the light collector/transmitter back to the source.

As described in FIG. 1 where the device is a relatively low gain device it is triggered by a first pulse of a sequence of at least two incident pulses and wherein the duration of pulse for exciting the laser medium is relatively long, i.e. more than 100 nano seconds.

As described in FIG. 2 where the device is a relatively high gain device it is triggered by portion of a single incident pulse, the other portion of which is stored prior to amplification and wherein the duration of pulse for exciting the laser medium is relatively short, i.e less than 100 nano seconds.

The foregoing description is not intended to be restrictive of the broad scope of the invention.

I claim:

1. A remote site optical transponder device powered by a long life power source, having a steerable laser light collector/transmitter system, means for directing collected laser light into a laser amplifier medium whose excitation means is triggered by part of the energy contained in an incident pulse from a laser tracking system, a reflector located behind the laser medium which redirects the amplified incident pulse back through the laser medium and then through the light collector/transmitter back to the source.

2. A relatively low gain device as claimed in claim 1 wherein the said device is triggered by a first pulse of a sequence of at least two incident pulses and wherein the duration of pulse for exciting the laser medium is relatively long, i.e. more than 100 nano seconds.

3. A relatively high gain device as claimed in claim 1 wherein the said device is triggered by portion of a single incident pulse, the other portion of which is stored prior to amplification and wherein the duration of the pulse for exciting the laser medium is relatively short, i.e. less than 100 nano seconds.

4. A remote site laser transponder device powered by a long life power source having a steerable light collector, means for directing the collected light into a first laser amplifier medium whose excitation source is triggered by part of the energy contained in an incident pulse from a laser tracking system, a first reflector located behind the first laser amplifier medium which redirects the incident pulse onto a second reflector located behind a second laser amplifier medium, which directs the incident pulse through the second laser amplifier medium to a light transmitter and thence to a source, portion of the pulse being used to trigger the laser medium excitation system.

5. A device as claimed in claim 1 wherein the medium is neodymium doped yttrium garnet.

6. A device as claimed in claim 1 wherein the medium is gaseous iodine.

7. A device as claimed in claim 1 wherein the excitation system is composed of conventional flashtubes and/or photo emitting diodes.

8. A device as claimed in claim 1 wherein the excitation system is a particle exciter in the form of an electron beam.

9. A device as claimed in claim 4 wherein the medium is neodymium doped garnet.

10. A device as claimed in claim 4 wherein the excitation system is composed of conventional flashtubes and/or photo emitting diodes.

* * * * *